United States Patent

[11] 3,607,935

[72] Inventors Hans Hilmer;
 Gerhard Korger; Rudi Weyer; Walter Aumüller, all of Frankfurt am Main, Germany
[21] Appl. No. 750,887
[22] Filed July 25, 1958
[45] Patented Sept. 21, 1971
[73] Assignee Farbwerke Hoechst Aktiengesellschaft Vormals Meister Lucius & Bruning Frankfurt am Main, Germany
[32] Priority July 31, 1957
[33] Germany
[31] F 23664 IVb/12

[54] SULFONYL-UREAS AND A PROCESS FOR PREPARING THEM
3 Claims, No Drawings

[52] U.S. Cl. ..................................... 260/553 D, 424/321
[51] Int. Cl. ..................................... C07c 127/16
[50] Field of Search ........................... 167/51.5, 65 AD; 260/553, 553 D, 556

[56] References Cited
UNITED STATES PATENTS
2,907,692  10/1959  Haack et al. .................. 260/553
2,928,871  3/1960  Aeschlimann ................. 260/553
2,793,977  5/1957  Caspe ........................... 167/65
2,962,530  11/1929  Hahicht ........................ 260/553
2,975,212  3/1961  Wagner et al. ................ 260/553
FOREIGN PATENTS
64,492  5/1946  Denmark ....................... 260/553
OTHER REFERENCES
"Gilman" Organic Chemistry Vol. 1, 2nd Ed., John Wiley, N.Y. Pages 843 and 861 (copy available in U.S.P.O. Scientific Library.
"Ruschig et al." Arzn. Farsch. Vol. 8, No. 7a, pp. 448–454

Primary Examiner—John D. Randolf
Attorney—Curtis, Morris & Safford

ABSTRACT: This invention relates to antidiabetic sulfonylureas of the general formula

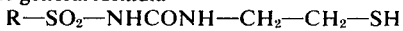

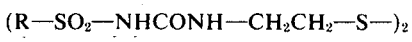

wherein R is phenyl or substituted phenyl, cycloalkyl or cycloalkyl-alkyl of 6–7 carbon atoms which have a good blood sugar lowering effect.

The above mercapto derivatives are made by reaction of the appropriate sulfonylurethanes, sulfonylisocyanates, or N-sulfonyl-N-acyl ureas with cystamine, which mercapto derivatives can be further oxidized to the disulfide compounds shown above.

SULFONYL-UREAS AND A PROCESS FOR PREPARING THEM

There have already been proposed as valuable medicaments having a blood sugar reducing effect compounds of the general formula R-SO$_2$-NH-CO-NH-R$_1$ in which R represents a phenyl group wherein one or two hydrogen atoms are substituted by equal or different alkyl or alkoxy groups whose alkyl group is preferably of low molecular weight, or by halogen atoms, or represents an aliphatic or cycloaliphatic hydrocarbon radical having from three to eight carbon atoms and R$_1$ stands for an aliphatic or cycloaliphatic hydrocarbon radical containing from two to eight carbon atoms. From sulfonyl-ureas of a similar structure containing an amino-benzene-sulfonyl group it is likewise known that they show a hypoglycemic effect. In practical therapy two sulfonyl-ureas have hitherto got great importance as antidiabetics to be orally administered, viz N-(4-amino-benzene-sulfonyl)-N'-n-butyl-urea and N-(4-methyl-benzene-sulfonyl)-N'-n-butyl-urea.

Now we have found that surprisingly sulfonyl-ureas of the general formula R-SO$_2$-NH-CO-NH-CH$_2$-CH$_2$-SH, or the disulfides obtained from the above compounds by oxidation and corresponding to the formula R-SO$_2$-NH-CO-NH-CH$_2$-CH$_2$-S-S-CH$_2$-CH$_2$-NH-CO-NH-SO$_2$-R in which R represents a phenyl radical, wherein one or two hydrogen atoms can be substituted by equal or different alkyl and/or alkoxy groups, whose alkyl group contains 1–4 carbon atoms, and/or by halogen atoms, or represents a cyclo-alkyl or a cyclo-alkyl-alkyl radical containing from six to seven carbon atoms, are also valuable medicaments especially characterized by a good blood sugar lowering effect.

The present invention relates also to the manufacture of such compounds by processes which are generally applied for the preparation of N-sulfonyl-N'-β-mercapto-ethyl-ureas and their conversion into the corresponding disulfides.

The following methods of preparation are particularly suitable: Sulfonyl-urethanes of the formula

R-SO$_2$-NH-COO-R$_1$ in which R has the aforesaid meaning and R$_1$ represents an alkyl radical of low molecular weight, are reacted by heating with cystamine It is likewise possible to react with cystamine N-sulfonyl-N'-acyl-ureas of the general formula R-SO$_2$-NH-CO-NH-acyl, wherein "acyl" represents any acyl group desired, by melting them together and, if desired, to transform the resulting N-sulfonyl-N'-β-mercapto-ethyl-ureas by means of oxidizing agents into the corresponding disulfides. It is, however, likewise possible to obtain the last-mentioned ureas of the formula

R-SO$_2$-NH-CO-NH-CH$_2$-CH$_2$-S-S-CH$_2$-CH$_2$-NH-CO-NH-SO$_2$-R by starting from cystamine and reacting this compound with sulfonyl-isocyanates, sulfonyl-urethanes or N-sulfonyl-N'-acyl-ureas in a molar proportion of 1:2. It is, however, likewise possible to react sulfonyl-isocyanates with cysteamine in a molar proportion of 2:1 and to transform the compounds obtained into the desired ureas by means of hydrolytic reactions.

As starting materials for the process of the present invention there enter into consideration: benzene-sulfonyl-urethanes, particularly methyl-urethanes, which can also be substituted in the benzene-nucleus, such as N-benzene-sulfonyl-methyl-urethane, N-(4-methyl-benzene-sulfonyl)-methyl-urethane, N-(3-methyl-benzene-sulfonyl)-methyl-urethane, N-(4-ethyl-benzene-sulfonyl)-methyl-urethane, N-(4-isopropyl-benzene-sulfonyl)-methyl-urethane, N-(4-chloro-benzene-sulfonyl)-methyl-urethane, N-(4-methoxy-benzene-sulfonyl)-methyl-urethane, N-(3,4-dimethyl-benzene-sulfonyl)-methyl-urethane, N-(3,4-dimethoxy-benzene-sulfonyl)-methyl-urethane, N-(3-methyl-4-chloro-benzene-sulfonyl)-methyl-urethane; cycloaliphatic sulfonyl-urethanes carrying a cyclohexyl-, a cycloheptyl- and a cyclohexyl-methyl radical, such as N-cyclohexane-sulfonyl-methyl-urethane and N-cyclohexyl-methane-sulfonyl-methyl-urethane; furthermore the corresponding sulfonyl-ureas acylated at one nitrogen atom, for example N-benzene-sulfonyl-N'-acetyl-urea, N-benzene-sulfonyl-N'-butyryl-urea, N-(4-methyl-benzene-sulfonyl)-N'-acetyl-urea, N-cyclohexane-sulfonyl-N'-acetyl-urea, and the like. Instead of the urethanes there can also be used the corresponding isocyanates, such as benzene-sulfonyl-isocyanate, 4-methyl-benzene-sulfonyl-isocyanate, 4-chloro-benzene-sulfonyl-isocyanate, and cyclohexane-sulfonyl-isocyanate.

As reaction component for the reaction with the above-mentioned sulfonyl-urethanes and sulfonyl-acyl-ureas cysteamine is preferably used, whereas cystamine can be reacted with sulfony-isocyanates, sulfonyl-urethanes and sulfonyl-acyl-ureas of the above-mentioned type.

The reaction conditions under which the processes for the manufacture of the products are carried out may vary within wide limits and can be adapted to each particular case. When producing di-[(N-sulfonyl)-N'-(2'-ethyl-urea)]-disulfides from sulfonyl-isocyanates it is favorable to operate in the presence of diluents or inert organic solvents such as benzene, toluene, chlorobenzene or dioxane and at room temperature, whereas the sulfonyl-urethanes and the N-sulfonyl-N'-acyl-ureas are, in general, advantageously heated to temperatures between 100° and 160° C. with the equivalent amount of cysteamine or half the equivalent of cystamine in the absence of solvents. Also in these cases the presence of inert diluents, such as toluene, xylene or chlorobenzene may be favorable.

The corresponding disulfides from N-sulfonyl-N'-(β-mercapto-ethyl)-ureas can be obtained in a simple manner according to the methods applied for the transformation of cysteamine into cystamine, for instance by smooth oxidation of the mercaptanes or their soluble alkali metal salts by means of oxidation agents such as hydrogen peroxide, iodine, potassium ferricyanide.

The sulfonyl-urea derivatives obtained according to the process of the present invention in the form of the mercaptanes or the disulfides are valuable medicaments particularly characterized by a considerable blood sugar reducing effect. When administered for instance to normally fed rabbits in a single dose of 400 milligrams/kilogram on an average, for instance in bicarbonate alkaline solution or in the form of their alkali metal salts, they rapidly provoke a reduction of the blood sugar value which reaches a maximum of about 30 to 40 percent of the initial value within 3 to 4 hours. The blood sugar values can be determined by hourly analyses according to the method of Hagedorn-Jensen. The reduction of the blood sugar level is ascertained by comparison with the blood sugar values of similarly fed but nontreated control animals.

TABLE

| Substance in the form of its sodium salt | Maximum reduction of the blood sugar value in the rabbit |
|---|---|
| 1. N-(4-methyl-benzene-sulfonyl)-N'-(2'-mercapto-ethyl)-urea | 40% |
| 2. di-[(N-4-methyl-benzene-sulfonyl)-N'-(2'-ethyl)-urea]-disulfide | 25% |
| 3. N-cyclohexane-sulfonyl-N'-(2'-mercapto-ethyl)-urea | 30% |
| 4. N-(4-ethyl-benzene-sulfonyl)-N'-(2'-mercapto-ethyl)-urea | 35% |
| 5. N-(4-chloro-benzene-sulfonyl)-N'-(2'-mercapto-ethyl)-urea | 30% |
| 6. N-(3,4-dimethyl-benzene-sulfonyl)-N'-(2'-mercapto-ethyl)-urea | 30% |
| 7. di-[(N-4isopropyl-benzene-sulfonyl)-N'-(2'-ethyl)-urea]-disulfide | 30% |
| 8. di-[N-cyclo-hexane-sulfonyl-N'-(2'-ethyl)-urea]-disulfide | 40% |

The strong hypoglycemic effect of the sulfonyl-(β-mercapto-ethyl)-ureas could not be expected since sulfonyl-ureas of similar structure, in which the sulfur atom of the mercapto-group is replaced by an oxygen atom, for instance N-(4-methyl-benzeneesulfonyl)-N'-(2'-hydroxy-ethyl)-urea are without effect. Bis-sulfonyl-ureas in which two urea molecules have a common alkyl radical, such as

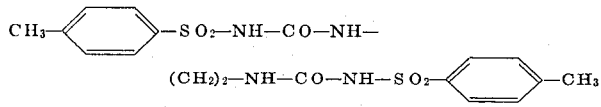

are likewise deprived of a blood sugar lowering effect so that it has to be assumed that the effect shown by the sulfonyl-ureas with a disulfide linkage obtained according to the present invention depends upon the fact that in a manner analogous to the splitting of cystamine into cysteamine these ureas are split into the monomeric mercapto compounds. This opinion is corroborated by the fact that di-[(N-(4-methyl-benzene-sulfonyl)-N'-(2'-ethyl-urea)]-monosulfide does not exhibit a hypoglycemic effect.

The compounds obtained according to the process of the present invention are of low toxicity and are well tolerated. For example, for N-cyclohexane-sulfonyl-N'-(2'-mercapto-ethyl)-urea when orally administered to albino mice the $LD_{50}$ amounted to more than 7 grams/kilogram. The acute toxicity tested by intravenous injection amounted to 0.92 gram/kilogram of mouse.

The compounds as such can be worked up to pharmaceutical preparations or in some cases likewise in the form of their salts, if desired in admixture with pharmaceutically suitable carriers. They can be applied for instance in the form of tablets, dragees, capsules and drops.

The following examples serve to illustrate the invention but they are not intended to limit it thereto.

EXAMPLE 1 a. N-(p-toluene-sulfonyl)-N'-(2'-mercapto-ethyl)-urea.
24.3 grams of p-toluene-sulfonyl-carbamic acid ethyl-ester and 24.0 grams of cysteamine are heated to melting on the wire net and maintained at 130°–135° C. for about 15 minutes. The mass is allowed to cool and the residue it triturated with five times its quantity of water. A weakly reddish oil remains undissolved and is filtered off. The filtrate is acidified by means of concentrated hydrochloric acid (about 10 N) whereby a white precipitate is obtained which is filtered off with suction and washed with water. After recrystallization from ethanol white crystals are obtained melting at 159° C. The N-(p-toluene-sulfonyl)-N'-(2'-mercapto-ethyl)-urea is soluble in acetone, chloroform, hot methanol//ethanol, alkalies less readily soluble in ether, difficultly soluble in hot water and insoluble in aqueous hydrochloric acid.

b. di-[N-(p-toluene-sulfonyl)-N'-(2'-ethyl-urea)]-disulfide.
12.4 grams of N-(p-toluene-sulfonyl)-N'-(mercapto-ethyl)-urea are dissolved in 400 cc. of aqueous sodium bicarbonate solution (of about 8 percent strength) and a solution of 5.74 grams of iodine and 7.5 grams of potassium iodide in 250 cc. of water is added. The mixtures assume a weakly yellow tint which disappears on adding one drop of sodium-bisulfite solution. After addition of charcoal the mass is filtered off with suction and the filtrate is acidified by means of 40 cc. of concentrated hydrochloric acid. The white precipitate obtained is filtered off with suction, washed with water and dried in the drying chamber. 10.6 grams of di-[N-(p-toluene-sulfonyl)-N'-(2'-ethyl-urea)]-disulfide are obtained melting at 193° C. The substance is sparingly soluble in hot water, soluble in hot methanol/ethanol and soluble in aqueous sodium hydroxide solution.

EXAMPLE 2 a. N-cyclohexane-sulfonyl-N'-(2'-mercapto-ethyl)-urea.
66.3 grams of N-cyclohexane-sulfonyl-carbamic acid methyl-ester and 25.4 grams of cysteamine are well mixed, melted together at 115° C. while stirring and heated for 10 minutes at 130°–135° C. the reaction mixture solidified in the meantime is subsequently maintained for 1 hour under reduced pressure at a temperature of **°–130° C. The reaction product is recrystallized from about 700 cc. of acetonitrile, thoroughly washed with water and dried at 100° C. In this manner the N-cyclohexane-sulfonyl-N'-(2'-mercapto-ethyl)-urea melting at 176°–178° C. is obtained in good yield. The sulfonyl-urea is easily soluble with salt formation in dilute bases.

b. di-[N-cyclohexane-sulfonyl-N'-(2'-ethyl)-urea]-disulfide.

29 grams of N-cyclohexane-sulfonyl-N'-(2'-mercapto-ethyl)-urea are dissolved by heating in 200 cc. of ethanol and to the solution are added dropwise about 10 grams of hydrogen peroxide of 35 percent strength. The reaction mixture is subsequently boiled for 15 to 20 minutes, filtered and cooled, whereby the di-[N-cyclohexane-sulfonyl-N'-(2'-ethyl)-urea]-disulfide is separated off as a crystalline mass. The crystals melt at 198°–201° C. The disulfide is likewise easily soluble in dilute bases such as dilute ammonia.

EXAMPLE 3

N-(4-ethyl-benzene-sulfonyl)-N'-(2'-mercapto-ethyl)-urea.

48.6 grams of N-(4-ethyl-benzene-sulfonyl)-carbamic acid methyl-ester and 17 grams of cysteamine are melted together and heated for 45 minutes to 140°–150° C. while stirring. The reaction mixture is maintained for a further 30 minutes under reduced pressure at the same temperature, in order to eliminate as completely as possible the methanol split off during the formation of urea. The reaction product is then taken up in the heat of 500 cc. of dilute ammonia (1:25). On cooling the ammonium salt of N-(4-ethyl-benzene-sulfonyl)-N'-(2'-mercapto-ethyl)-urea is separated off which is only sparingly soluble in cold water. Without isolating the salt the mass is diluted with an amount of water causing the dissolution of the precipitate. A small amount of undissolved matter is filtered off and the clear filtrate is acidified by means of concentrated hydrochloric acid. The separated precipitate of N-(4-ethyl-benzene-sulfonyl)-N'-(2'-mercapto-ethyl)-urea is filtered off with suction, washed with water and dried. The yield amounts to 50 grams. Melting point 145°–147° C. (after recrystallization from acetonitrile).

EXAMPLE 4

N-(4-chloro-benzene-sulfonyl)-N'-(2'-mercapto-ethyl)-urea.

42.8 grams of N-(4-chloro-benzene-sulfonyl)-carbamic acid methyl-ester and 17 grams of cysteamine are reacted according to the directions given in example 3. The resulting melt is recrystallized from about 200 cc. of acetonitrile, the crystals are thoroughly washed with water and dried. N-(4-chloro-benzene-sulfonyl)-N'-(2'-mercapto-ethyl)-urea obtained melts at 181°–183° C.

EXAMPLE 5

N-(3,4-dimethyl-benzene-sulfonyl)-N'-(2'-mercapto-ethyl)-urea.

24.3 grams of N-(3,4-dimethyl-benzene-sulfonyl)-carbamic acid methyl-ester and 8.5 grams of cysteamine are melted together and the clear melt is heated while stirring in an oil bath for 90 minutes to 110°–125° C., for one hour under normal pressure and for 30 minutes under reduced pressure. The melt is then recrystallized from a little acetonitrile, the crystals obtained are triturated with water and the product obtained by filtering with suction is very thoroughly washed with water. After drying the N-(3,4-dimethyl-benzene-sulfonyl)-N'-(2'-mercapto-ethyl)-urea is obtained, melting at 153°–155° C.

EXAMPLE 6

Di-[N-(4-isopropyl-benzene-sulfonyl)-N'-(2'-ethyl)-urea]-disulfide.

77.1 grams of N-(4-isopropyl-benzene-sulfonyl)-carbamic acid methyl-ester are taken up in 150 cc. of one-molar cystamine solution and the clear solution obtained is completely evaporated under reduced pressure. The remaining residue is then heated while stirring under reduced pressure for 90 minutes to 125°–130° C. The resulting melt is taken up in a still warm state in dilute ammonia. This solution is diluted with water, the pH is adjusted to about 8 by means of concentrated hydrochloric acid, the solution is heated with coal and filtered several times. After allowing to cool the filtrate is again sucked through a carbon layer and then acidified by means of hydrochloric acid. A crystalline precipitate of di-[N-(4-isopropyl-benzene-sulfonyl)-N'-(2'-ethyl)-urea]-disulfide is separated off which after having been recrystallized from methanol melts at 147°–148° C. (with decomposition and which represents the above-mentioned disulfide.

EXAMPLE 7

N-(4-methyl-benzene-sulfonyl)-N'-(2'-mercapto-ethyl)-urea.

22.5 grams of N-(4-methyl-benzene-sulfonyl)-N'-acetyl-urea and 10.0 grams of cysteamine are heated under slightly reduced pressure for a short time to 180° C. When the mixture of substances has melted the temperature is maintained for 90 minutes at 130° C. After cooling the molten mass is treated by means of ammonia solution of 1 percent strength and small parts of undissolved matter are filtered off. On acidifying the filtrate by means of dilute hydrochloric acid there is at first obtained a greasy precipitate of crude N-(4-methyl-benzene-sulfonyl)-N'-(2'-mercapto-ethyl)-urea. After recrystallization from ethanol the substance melts at 154°–155° C. The yield amounts to about 15 grams.

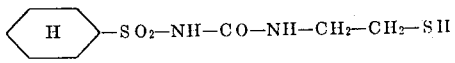

We claim:
1. A member selected from the group consisting of (1) N-sulfonyl-N'-β-mercapto ethyl ureas of the formula:
R-SO$_2$-NH-CO-NH-CH$_2$CH$_{CH2}$-SH
(2) disulfides of the formula:
R-SO$_2$-NH-CO-NH-CH$_2$-CH$_2$-S-S-CH$_2$-CH$_2$-NH-CO-NH-SO$_2$-R and (3) nontoxic basic salts thereof wherein R represents a member of the group consisting of cycloalkyl of six to seven carbon atoms and cycloalkylalkyl of six to seven carbon atoms.

2.

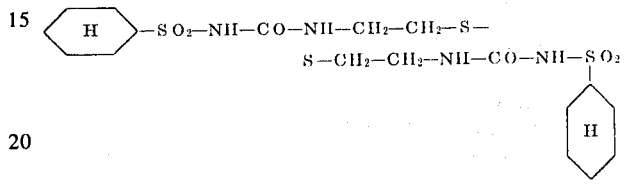

3.